United States Patent
Abe

(10) Patent No.: US 7,133,063 B2
(45) Date of Patent: Nov. 7, 2006

(54) ELECTRONIC ENDOSCOPE APPARATUS WHICH SUPERIMPOSES SIGNALS ON POWER SUPPLY

(75) Inventor: Kazunori Abe, Saitama (JP)

(73) Assignee: Fujinon Corporation, Saitama (JP)

( * ) Notice: Subject to any disclaimer, the term of this patent is extended or adjusted under 35 U.S.C. 154(b) by 707 days.

(21) Appl. No.: 10/619,077

(22) Filed: Jul. 15, 2003

(65) Prior Publication Data

US 2004/0070668 A1    Apr. 15, 2004

(30) Foreign Application Priority Data

| Jul. 16, 2002 | (JP) | ............................. 2002-206534 |
| Jul. 16, 2002 | (JP) | ............................. 2002-206535 |
| Aug. 29, 2002 | (JP) | ............................. 2002-250406 |

(51) Int. Cl.
*A62B 1/04* (2006.01)
*H04N 7/18* (2006.01)
*H04N 9/47* (2006.01)

(52) U.S. Cl. ...................................................... 348/65
(58) Field of Classification Search .................... None
See application file for complete search history.

(56) References Cited

U.S. PATENT DOCUMENTS

| 4,024,529 | A | * | 5/1977 | Sakai | ............................. 345/67 |
| 4,333,105 | A | * | 6/1982 | Kaku et al. | .................. 348/811 |
| 5,298,914 | A | * | 3/1994 | Yamazaki | .................... 345/103 |
| 5,402,769 | A | * | 4/1995 | Tsuji | ........................... 600/109 |
| 5,442,370 | A | * | 8/1995 | Yamazaki et al. | ............. 345/94 |
| 2004/0073086 | A1 | * | 4/2004 | Abe | ........................... 600/109 |

* cited by examiner

*Primary Examiner*—Nhon Diep
(74) *Attorney, Agent, or Firm*—Snider & Associates; Ronald R. Snider

(57) ABSTRACT

An electronic endoscope apparatus has a single coaxial cable which combines a power line and signal line installed between a scope and a processor unit. A waveform superimposing circuit of the scope superimposes a video signal on power transmitted through the coaxial cable and superimposes scope-side reference pulses on a blanking period of the first horizontal line signal in the first field of the video signal. On the other hand, the processor unit superimposes processor-side reference pulses on a blanking period of the first horizontal line in the second field of the video signal. Then, the scope and the processor unit perform video processing based on timing signals synchronized with the reference pulses. Alternatively, an electromagnetic coupler may be installed instead of the coaxial cable and the video signal and reference pulses may be superimposed on AC power supplied electromagnetically.

12 Claims, 10 Drawing Sheets

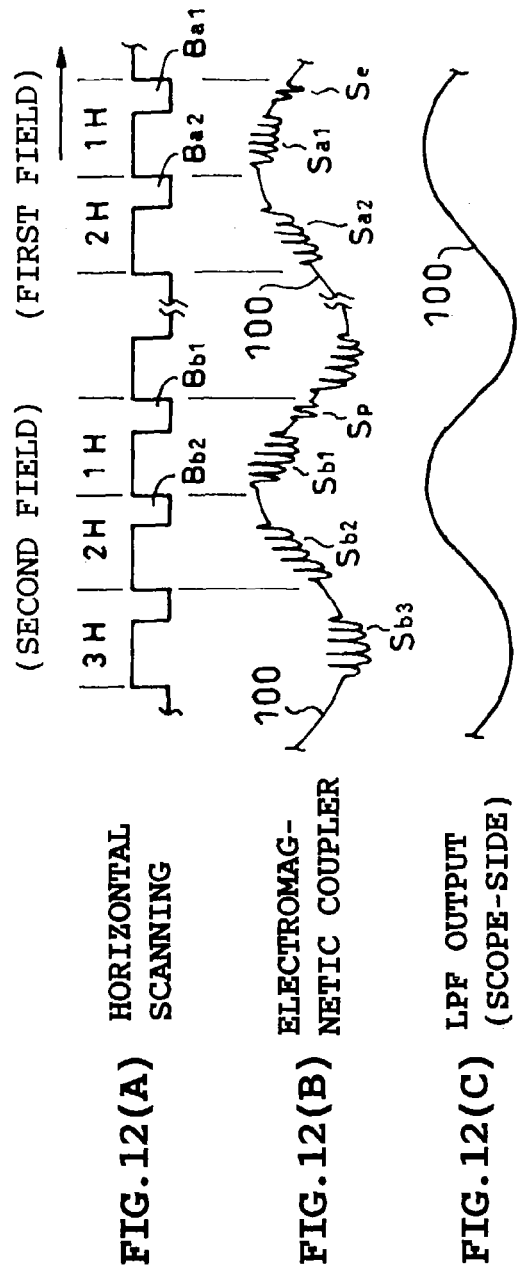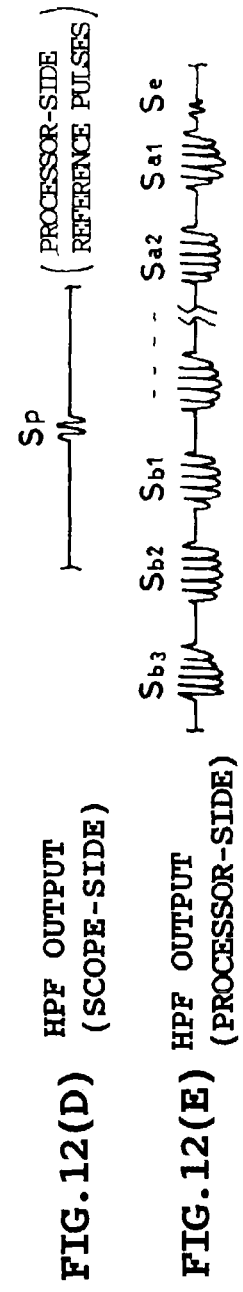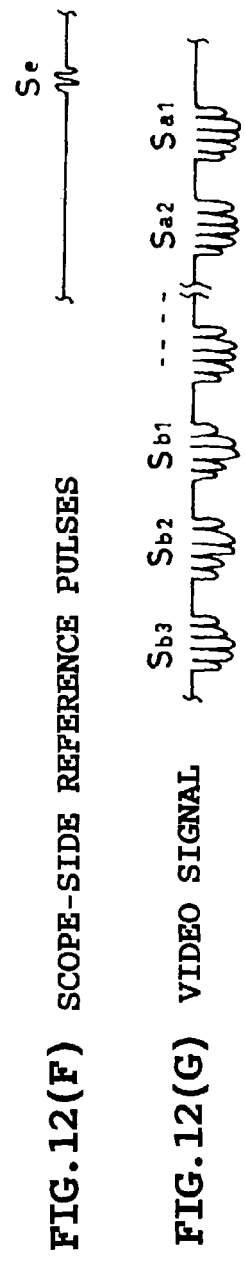

ELECTRONIC ENDOSCOPE APPARATUS WHICH SUPERIMPOSES SIGNALS ON POWER SUPPLY

BACKGROUND OF THE INVENTION

This application claims the priority of Japanese Patent Applications Nos. 2002-206534 and 2002-206535 filed on Jul. 16, 2002 and No. 2002-250406 filed on Aug. 29, 2002 which are incorporated herein by reference.

1. Field of the Invention

The present invention relates to an electronic endoscope apparatus. More particularly, it relates to a configuration of connection wires and signal transmission for supplying power and video signals between an electronic endoscope which is a scope and a processor unit which is connected with the electronic endoscope.

2. Description of the Related Art

In an electronic endoscope apparatus, an electronic endoscope equipped, for example, with a CCD (Charge Coupled Device) which is a solid-state image sensor is connected to a processor unit via a cable and connector. Through these cable and connector, power is supplied and various control signals are transmitted from the processor unit to the scope while a video signal and various control signals are transmitted from the scope to the processor unit.

Thus, the scope is driven by DC power supplied from the processor unit via a power line while a video signal picked up by the CCD is transmitted to the processor unit via a signal line (transmission line). As the processor unit performs various types of color video processing on the video signal, images of the object under observation are displayed on a monitor.

However, with the electronic endoscope apparatus described above, the cable connecting the scope with the processor unit contains a power line and a plurality of signal lines. Consequently, the cable connector has a multi-pin architecture, which may cause bad connections or breakage of some connection pins in addition to being expensive.

Recently, CCDs have been growing in pixel count. This creates a need to connect various scopes equipped with CCDs which have increased but different pixel counts to a common processor unit.

The present invention has been made in view of the above problems. Its object is to provide an electronic endoscope apparatus which can use a common line for power supply and signal transmission, connect a scope and processor unit using a minimal number of lines, and form images in good condition even when scopes equipped with CCDs with different pixel counts are connected to a common processor unit.

SUMMARY OF THE INVENTION

To achieve the above object, a first invention provides an electronic endoscope apparatus comprising: an electronic endoscope equipped with an image pickup device; a main unit which is connected with the electronic endoscope and includes a processor unit; a common power/signal line which connects the electronic endoscope with the main unit; a power supply circuit which is installed in the main unit and supplies power to the electronic endoscope via the common power/signal line; a video waveform superimposing circuit which is installed in the electronic endoscope and superimposes a video signal obtained by the image pickup device on the power transmitted through the common power/signal line; a pulse waveform superimposing circuit which superimposes reference pulses on a blanking period in the first field (in the case of interlaced scanning) or first frame (in the case of non-interlaced scanning) of the video signal; a pulse separating circuit which separates the reference pulses superimposed on the common power/signal line; a circuit which forms a signal in synchronization with the reference pulses; and a video separating circuit which is installed in the processor unit and separates the video signal superimposed on the common power/signal line.

A processor-side pulse waveform superimposing circuit which superimposes processor-side reference pulses generated by a synchronizing signal generating circuit of the processor unit may be installed as the pulse waveform superimposing circuit while the pulse separating circuit may be installed in the electronic endoscope.

Also, a scope-side pulse waveform superimposing circuit which superimposes scope-side reference pulses generated by a timing generator of the electronic endoscope may be installed as the pulse waveform superimposing circuit while the pulse separating circuit may be installed in the processor unit.

The electronic endoscope and the processor unit are connected by a single coaxial cable (or two electric wires including a ground wire), power is supplied from the processor unit to the electronic endoscope via the coaxial cable serving as the common power/signal line, and the video signal is transmitted from the electronic endoscope to the processor unit with its waveform superimposed on the power (power supply level) transmitted through the common power/signal line. A clock signal of approximately ten pulses is superimposed as, for example, the processor-side reference pulses (or scope-side reference pulses) on a blanking period (or optical black level period) of, for example, the first horizontal line signal in the first field (generally an odd-numbered field; or the first frame in the case of non-interlaced scanning) of the video signal.

In the electronic endoscope (processor unit if the processor-side reference pulses are used), various timing signals including a clock signal, horizontal synchronizing signal, and vertical synchronizing signal are formed by PLL method in synchronization with the approximately ten reference pulses and the video signal is processed based on these signals. In the processor unit, the video signal supplied through the coaxial cable is separated by a separating circuit and video processing is performed on it to allow images of the object under observation to be displayed on a monitor in good condition.

Furthermore, a power receiving circuit may be installed in the electronic endoscope to full-wave rectify DC power superimposed with the video signal, using a full-wave rectifier circuit. Then, the DC power supplied from the processor unit and superimposed with the video signal is full-wave rectified by the full-wave rectifier circuit. This makes it possible, for example, to restore the supply voltage lost when superimposed with the video signal, allowing stable DC power supply.

A second invention provides an electronic endoscope apparatus comprises: an electronic endoscope; a main unit; a common power/signal line; a power supply circuit; a scope-side waveform superimposing circuit which superimposes a video signal obtained by an image pickup device on power transmitted through the common power/signal line and superimposes scope-side reference pulses on a predetermined blanking period in the video signal; a processor-side waveform superimposing circuit which superimposes processor-side reference pulses on a predetermined blanking period that occurs in the video signal supplied through the common power/signal line and that is not superimposed with the scope-side reference pulses; a processor-side separating circuit which separates the video signal and scope-side reference pulses superimposed on the common power/signal line; a processor-side synchronizing signal generating circuit which forms a signal synchronized with the scope-side reference pulses outputted from the processor-side separating circuit; a scope-side separating circuit which separates the processor-side reference pulses superimposed on the common power/signal line; and a scope-side timing generator (which functions as a synchronizing signal generating circuit) which forms a signal synchronized with the processor-side reference pulses outputted from the scope-side separating circuit.

The scope-side waveform superimposing circuit may superimpose the scope-side reference pulses on a predetermined blanking period in the first field or first frame of the video signal while the processor-side waveform superimposing circuit may superimpose the processor-side reference pulses on a predetermined blanking period in the second field or second frame of the video signal.

The scope-side waveform superimposing circuit may superimpose the scope-side reference pulses on a predetermined blanking period in the second field or second frame of the video signal while the processor-side waveform superimposing circuit may superimpose the processor-side reference pulses on a predetermined blanking period in the first field or first frame of the video signal.

Furthermore, oscillation frequency of an oscillator installed in the processor-side synchronizing signal generating circuit may differ from oscillation frequency of an oscillator installed in the scope-side timing generator.

According to the second invention described above, the video signal over the power supplied through the common power/signal line is superimposed with the scope-side reference pulses during a blanking period of, for example, the first horizontal line signal in the first field, and with the processor-side reference pulses during a blanking period of, for example, the first horizontal line signal in the second field (generally an even-numbered field; or the second frame in the case of non-interlaced scanning).

For example, if the electronic endoscope is equipped with a 270,000-pixel image pickup device while the processor unit is configured to handle 410,000-pixel image pickup devices as standard, the electronic endoscope uses a clock signal with an oscillation frequency of 19.0632 MHz while the processor unit uses a clock signal with an oscillation frequency of 28.6363 MHz, and thus the pulse with a frequency of 19.0909 MHz obtained by dividing the frequency of 28.6363 MHz at a ratio of 2/3 is superimposed as the processor-side reference pulses.

Then, in the processor unit, a clock signal is formed, for example, by PLL method in synchronization with the approximately ten scope-side reference pulses while in the electronic endoscope, a clock signal is formed by PLL method in synchronization with the approximately ten processor-side reference pulses. Based on these clock signals as well as various timing signals formed by them, the video signal is processed.

Also, the processor unit in the second electronic endoscope apparatus may compensate the horizontal line signal of the video signal separated from the transmitted power with a horizontal synchronizing signal generated by the processor-side synchronizing signal generating circuit. Therefore, the horizontal line signal of the video signal obtained, for example, by a 270,000-pixel image pickup device is compensated with a horizontal synchronizing signal formed by a 28.6363-MHz oscillation signal on the processor side. This solves horizontal contraction and expansion, making it possible to obtain images in good condition.

A third invention provides an electronic endoscope apparatus comprises: an electronic endoscope; a main unit; an electromagnetic coupler which electromagnetically connects the electronic endoscope and the main unit to supply electric power and signals; a power supply circuit which is installed in the main unit and supplies AC power to the electronic endoscope via the electromagnetic coupler; a power receiving circuit which is installed in the electronic endoscope and draws AC power through the electromagnetic coupler; a waveform superimposing circuit which superimposes a video signal obtained by an image pickup device on the power transmitted through the electromagnetic coupler and superimposes scope-side or processor-side reference pulses on a predetermined blanking period in a field or a frame of the video signal; a separating circuit which separates the video signal superimposed on the power transmitted through the electromagnetic coupler and scope-side or processor-side reference pulses; and a synchronizing signal generating circuit which forms a signal synchronized with the scope-side or processor-side reference pulses outputted from the separating circuit.

In the third invention described above, the electronic endoscope and processor unit are coupled electromagnetically without electric wires. Through the electromagnetic coupling, AC power is supplied from the processor unit to the electronic endoscope while the video signal is transmitted from the electronic endoscope to the processor unit with its waveform superimposed on the AC power. The video signal is superimposed with the scope-side reference pulses or processor-side reference pulses. Consequently, the electronic endoscope and processor unit process the video signal properly based on clock signals synchronized with the reference pulses.

BRIEF DESCRIPTION OF THE DRAWINGS

FIGS. 12A to 12G are waveform charts showing how AC power and signals are superimposed and separated according to the fourth embodiment.

DETAILED DESCRIPTION OF THE PREFERRED EMBODIMENTS

First Embodiment

Figure 1:
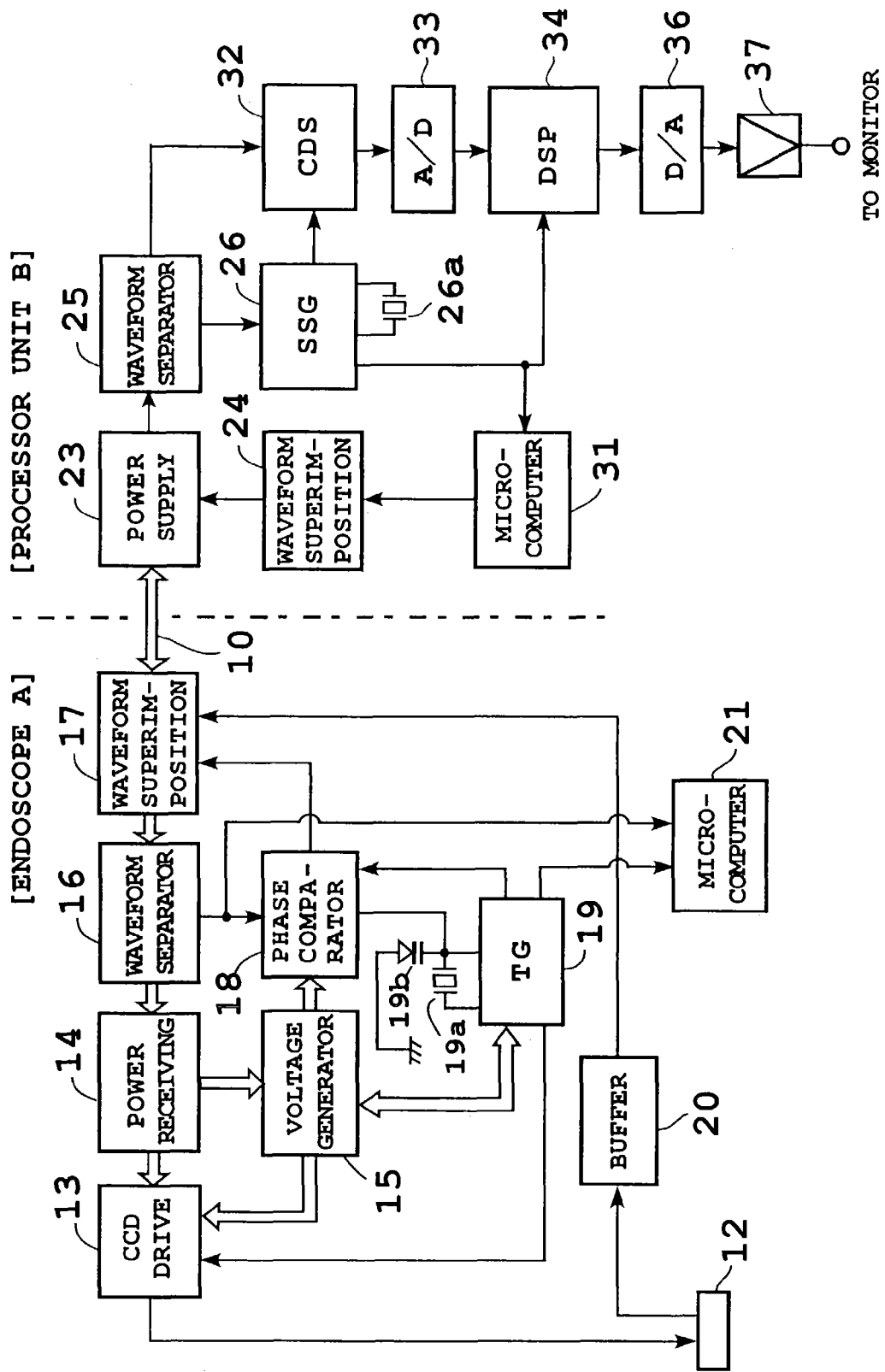
FIG. 1 is a block diagram showing configuration of an electronic endoscope apparatus according to a first embodiment.
Figure 2:
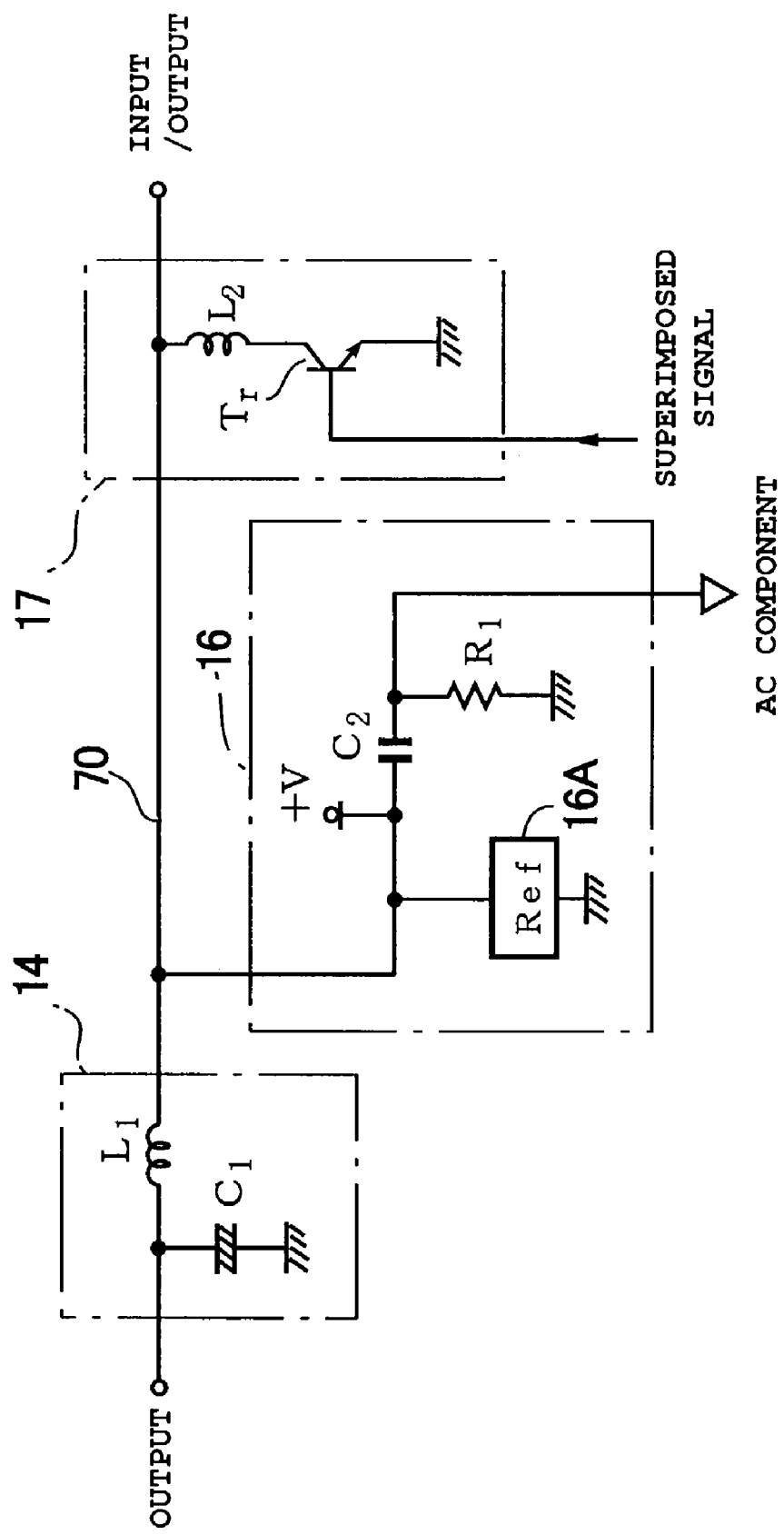
FIG. 2 is a diagram showing a concrete configuration of a power receiving circuit, waveform separating circuit, and waveform superimposing circuit according to the embodiment.

FIGS. 1 and 2 show configuration of an electronic endoscope apparatus according to a first embodiment. In FIG. 1, a scope (electronic endoscope) A is connected to a processor unit B by a single coaxial cable 10 which is a common power/signal line. The tip of the scope A is equipped with, for example, a 280,000-pixel CCD 12 and supplied with an illuminating beam (not shown) from a light source unit via a light guide.

The scope A comprises a CCD drive circuit 13 which drives the CCD 12, power receiving circuit 14 which feeds DC (direct current) power, switching regulator, etc. Also, it is equipped with a voltage generating circuit 15 which produces a plurality of supply voltages using power transmitted from the power receiving circuit 14, waveform separating circuit 16 which separates processor-side reference pulses (described later), control signals, etc. superimposed on the power transmitted through the coaxial cable 10, and waveform superimposing circuit 17 which superimposes a waveform of a video signal (interlaced scanning) on transmitted power.

Output of the waveform separating circuit 16 is input in a phase comparator circuit 18 and timing generator (TG) 19. The phase comparator circuit 18 compares the phase of an oscillation signal with the phase of the processor-side reference pulses supplied by a processor unit B (described later) and generates a voltage proportional to the phase difference. The timing generator 19 comprises a crystal oscillator 19a which generates a frequency of, for example, 28.6363 MHz and variable-capacitance diode 19b. It also functions as a synchronizing signal generating circuit: it feeds the output voltage of the phase comparator circuit 18 to the junction of the crystal oscillator 19a and variable-capacitance diode 19b, forms a PLL (Phase Locked Loop), and thereby generates a clock signal, horizontal synchronizing (HD) signal, and vertical synchronizing (VD) signal in synchronization with the processor-side reference pulses. The scope A is further equipped with a buffer 20 which stores output signals from the CCD 12 and microcomputer 21 which generally controls various circuits of the scope A.

The processor unit B comprises a power supply circuit 23 which supplies DC power to the scope A and waveform superimposing circuit 24 which superimposes the processor-side reference pulses and control signals on the power supplied by the power supply circuit 23 during a blanking period of the first horizontal line signal in the first field of the video signal. It also comprises a waveform separating circuit 25 which separates the video signal an AC component, crystal oscillator 26a which generates a frequency of, for example, 28.6363 MHz, and synchronizing signal generating circuit (SSG) 26 which generates a clock signal, horizontal synchronizing (HD) signal, vertical synchronizing (VD) signal, reset signal, etc. The clock signal from the synchronizing signal generating circuit 26 is used as the processor-side reference pulses.

Furthermore, the processor unit B comprises a microcomputer 31 which generally controls various circuits, correlated double sampling circuit (CDS) 32 which receives the video signal from the waveform separating circuit 25 and performs correlated double sampling, A/D converter 33, DSP (Digital Signal Processing) circuit 34 which performs various types of processing on the video signal to form color images, D/A converter 36, amplifier 37, etc.

FIG. 2 shows specific circuits of the scope A: the power receiving circuit 14, waveform separating circuit 16, and waveform superimposing circuit 17. The power receiving circuit 14 composes a smoothing circuit using a choke coil $L_1$ and a capacitor $C_1$, where the choke coil $L_1$ is connected in series with a power supply line 70 connected to the coaxial cable 10 and blocks high frequencies while the capacitor $C_1$ is connected in parallel with the power supply line 70. The waveform separating circuit 16 comprises a reference voltage source (Ref.) 16A which provides a reference voltage in response to input from the power supply line 70, capacitor $C_2$ which extracts an AC (alternating current) component, and resistor $R_1$. It separates the AC component, i.e., the processor-side reference pulses supplied from the processor unit B, from the power supply line 70.

The waveform superimposing circuit 17 has a coil $L_2$ and a transistor Tr installed between the power supply line 70 and ground. The transistor Tr has its collector connected to one end of the coil $L_2$, its emitter connected to ground, and its base supplied with the video signal from the buffer 20 as a superimposed signal. The configuration of the waveform superimposing circuit 17 and waveform separating circuit 16 similarly applies to the waveform superimposing circuit 24 and the waveform separating circuit 25 of the processor unit B, and the base of the transistor Tr in the waveform superimposing circuit 24 is supplied with the processor-side reference clock pulses from the synchronizing signal generating circuit 26.

In the first embodiment, configured as described above, when the processor unit B is powered on, DC power is supplied from the power supply circuit 23 to the scope A via the coaxial cable 10. Almost simultaneously, the waveform superimposing circuit 24 of the processor unit B superimposes approximately ten processor-side reference pulses (clock signal) with a frequency of 28.6363 MHz generated by the synchronizing signal generating circuit 26 on a blanking period of, for example, the first horizontal synchronizing signal in the first field of the video signal (in the case of interlaced scanning).

Figure 3:
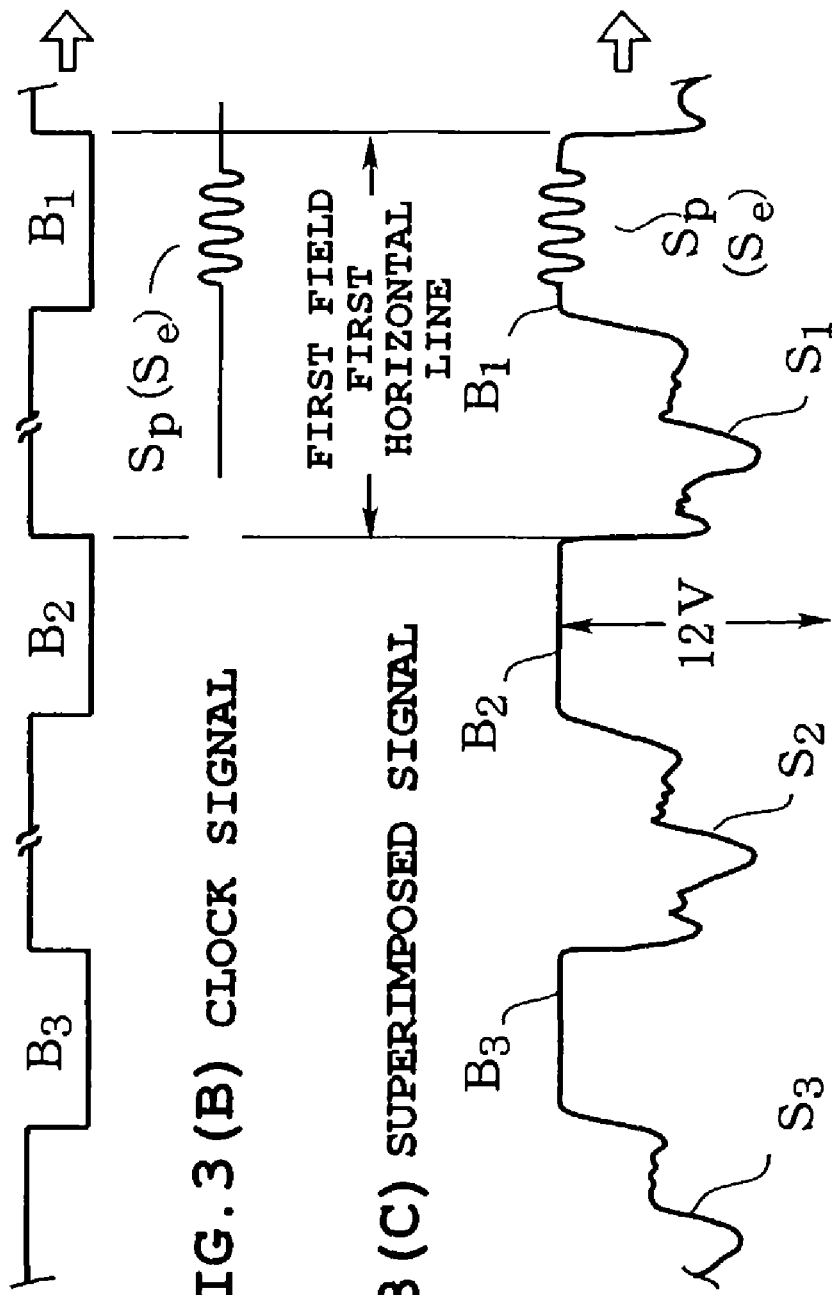
FIGS. 3A to 3C are diagrams showing signals superimposed on power transmitted through a coaxial cable and how the signals (voltage waveforms) are superimposed according to the first embodiment.

FIGS. 3A to 3B show signal waveforms superimposed on the power transmitted through the coaxial cable 10. When the horizontal synchronizing signal shown in FIG. 3A is formed, approximately ten reference pulses Sp are output and superimposed on the power transmitted through the coaxial cable 10, under the control of the microcomputer 31 during a blanking period $B_1$ of the first horizontal synchronizing signal.

On the other hand, in the scope A, the power receiving circuit 14 receives DC power from the power supply circuit 23, and then the voltage generating circuit 15 produces power supplies with predetermined voltages and provides them to various circuits. The waveform separating circuit 16 separates the AC component supplied via the coaxial cable 10, i.e., the processor-side reference pulses Sp superimposed on the blanking period $B_1$ in FIG. 3A. The AC component is supplied to the timing generator 19 via the phase comparator circuit 18. Then, in the phase comparator circuit 18 and timing generator 19, the PLL comes into action and the voltage applied to the variable-capacitance diode 19$b$ changes, causing a clock signal with a frequency of 28.6363 MHz to be generated in synchronization with the reference pulses Sp as well as causing timing signals such as a horizontal synchronizing signal and vertical synchronizing signal to be generated. Since the location of the processor-side reference pulses Sp is recognized as a blanking period of the first horizontal synchronizing signal (first horizontal line) in the first field, the timing generator 19 can synchronize horizontal scanning and vertical scanning with the pulses Sp.

The timing signals outputted from the timing generator 19 are supplied to the CCD drive circuit 13, which drives the CCD 12 to capture images of an object under observation. An image signal (video signal) outputted from the CCD 12 is supplied to the waveform superimposing circuit 17 via the buffer 20, superimposed on the transmitted power (70) by the waveform superimposing circuit 17, and supplied to the processor unit B via the coaxial cable 10.

FIG. 3C shows how signals are superimposed on transmitted power. For example, if a 12-volt DC power is used, horizontal line signals $S_1$, $S_2$, $S_3$, . . . of the video signal are superimposed in an inverted state on the supply voltage of 12 volts. The processor-side reference pulses Sp are superimposed on the blanking period $B_1$ of the first horizontal line $S_1$ in the first field, which is generally an odd-numbered field. Incidentally, control signals between the scope A and processor unit B may also be superimposed on the transmitted power.

Then, the waveform separating circuit 25 of the processor unit B separates the video signal containing the horizontal line signals $S_1$, $S_2$, $S_3$, . . . described with reference to FIG. 3C. The video signal is supplied to the CDS circuit 32, subjected to a correlated double sampling in the CDS circuit 32, converted into a digital signal by the A/D converter 33 in the next stage, subjected to color video processing in the DSP circuit 34, and supplied to the monitor via the D/A converter 36 and amplifier 37. In this way, the circuits in the processor unit B performs image forming processing based on the timing signals outputted from the synchronizing signal generating circuit 26 to allow images of the object under observation to be displayed on the monitor in good condition.

Figure 4:
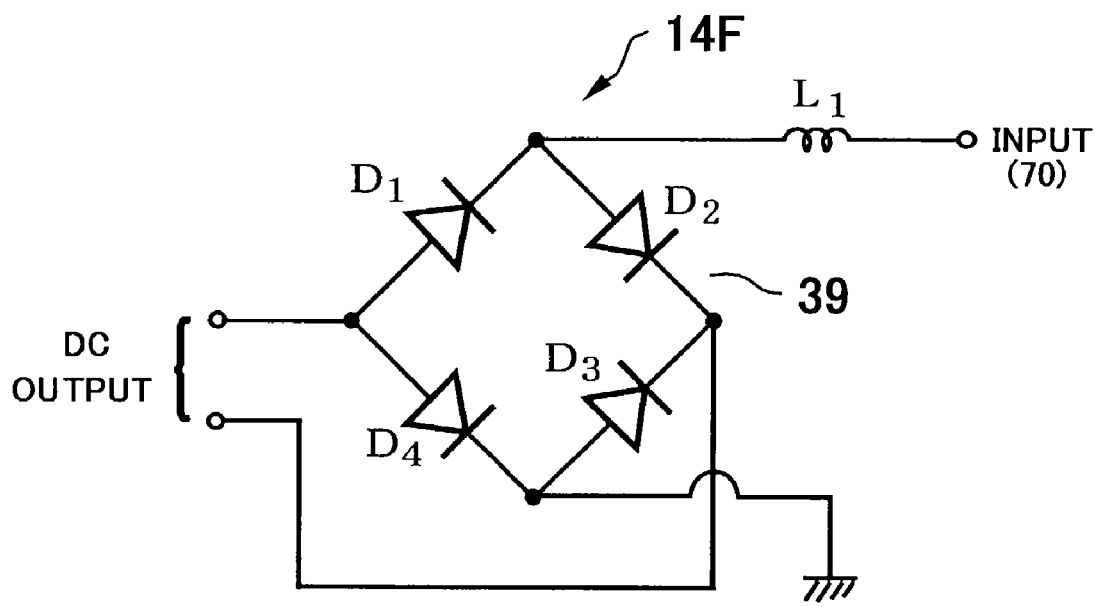
FIG. 4 is a diagram showing another configuration example of a power receiving circuit (full-wave rectifier circuit) according to the embodiment.

FIG. 4 shows a configuration example of a power supply circuit different from that of the first embodiment. This example is used instead of the power receiving circuit 14 shown in FIG. 2. As shown in FIG. 4, the power receiving circuit 14F is a smoothing circuit consisting of a choke coil $L_1$ connected to the power supply line 70 and a full-wave rectifier circuit 39 which in turn consists of rectifier diodes $D_1$, $D_2$, $D_3$, and $D_4$ (the full-wave rectifier circuit 39 may be configured otherwise). The power receiving circuit 14F has the effect of reducing voltage drops caused by the superimposition of the video signal, and thus stabilizing the power supply.

Figure 5A:
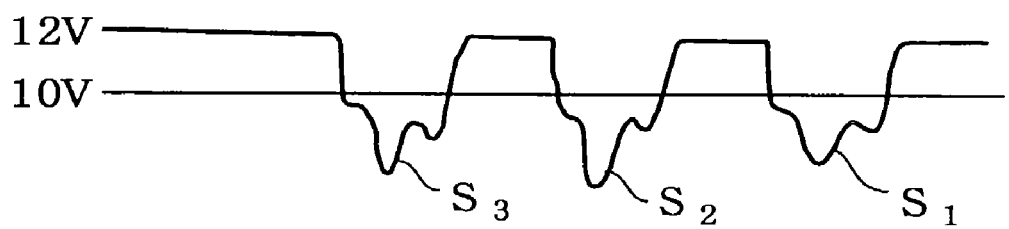
FIG. 5A is a diagram showing a state of supply voltage in the power receiving circuit shown in FIG. 4.

FIG. 5 shows a state of supply voltage in the example shown in FIG. 4 as compared to that of the first embodiment (FIG. 2). In the smoothing circuit according to the first embodiment, when the horizontal line signals $S_1$, $S_2$, $S_3$, . . . of the video signal are superimposed on, for example, the 12-volt DC power supplied from the processor unit B, the power receiving circuit 14F can produce a voltage of only approximately 10 volts as shown in FIG. 5A. Moreover, the level of the video signal varies with the brightness of images, which fact makes the approximately 10-V power supply unstable.

Figure 5B:
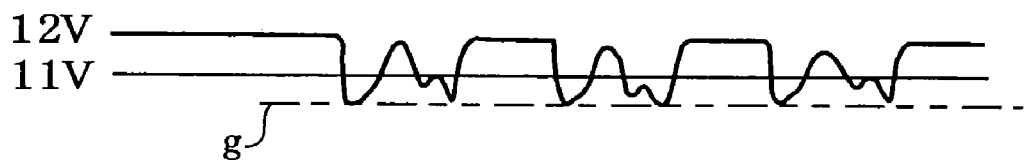
FIG. 5B is a diagram showing a state of supply voltage in the configuration shown in FIG. 2.

In contrast, as shown in FIG. 5B, the power receiving circuit 14F in the example shown in FIG. 4 provides a DC voltage of approximately 11 volts with small voltage drops because the video signal is inverted below line g by full-wave rectification. Thus, the circuit reduces voltage drops caused by the superimposition of the video signal. At the same time, it ensures stable power supply even if the level of the video signal varies.

Second Embodiment

Figure 6:
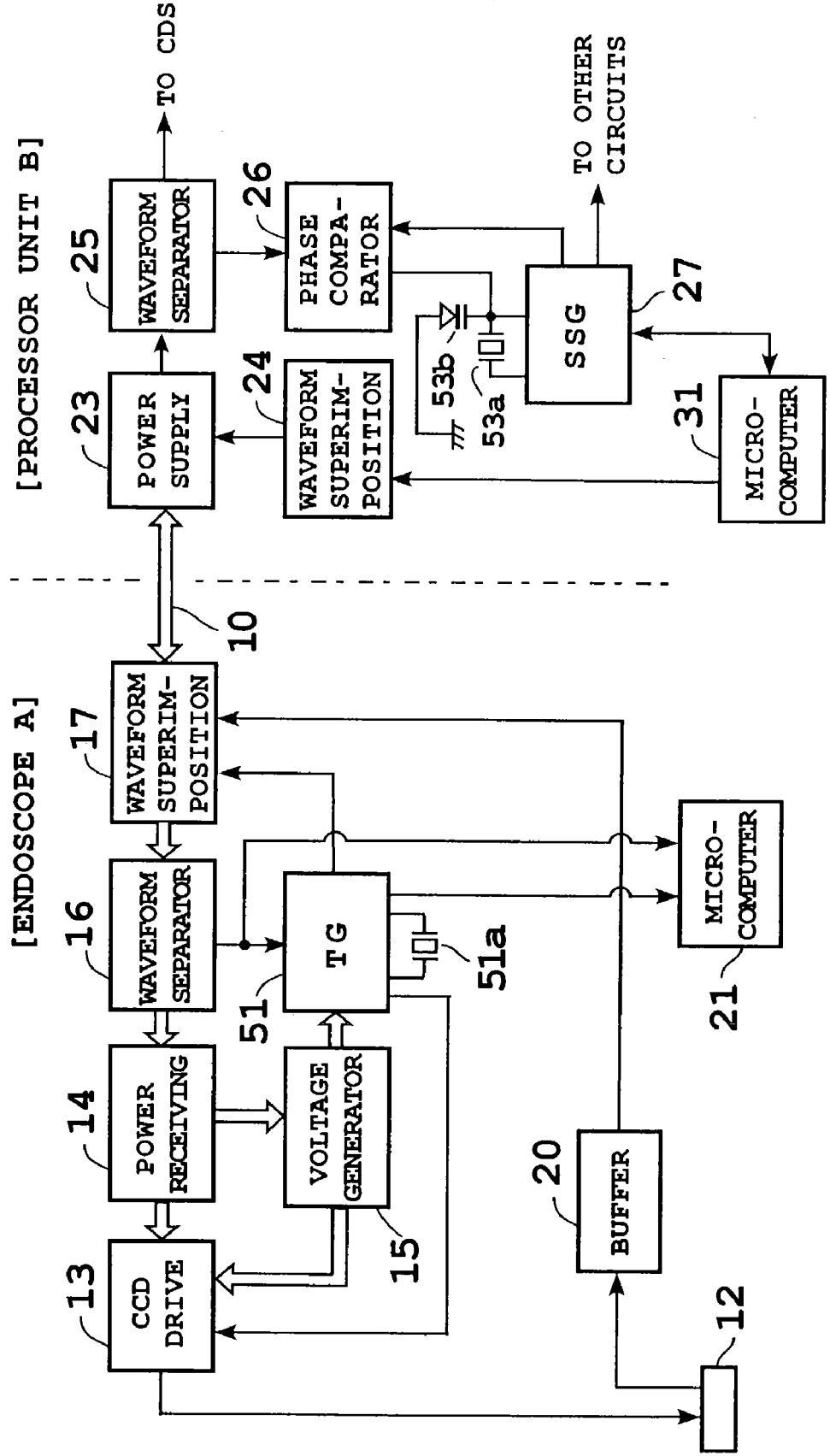
FIG. 6 is a block diagram showing configuration of an electronic endoscope apparatus according to a second embodiment.

FIG. 6 shows configuration of an electronic endoscope apparatus according to a second embodiment. According to this embodiment, reference pulses are sent from the scope A to the processor unit B. For that, the scope A eliminates the phase comparator circuit 18 shown in FIG. 1, and instead has a timing generator (TG) 51 equipped with a 28.6363-MHz crystal oscillator 51$a$ while the processor unit B has a phase comparator circuit 52 and a synchronizing signal generator (SSG) 53 equipped with a 28.6363-MHz crystal oscillator 53$a$ and a variable-capacitance diode 53$b$.

In the second embodiment, again DC power is supplied from the power supply circuit 23 of the processor unit B to the scope A via the coaxial cable 10. In the scope A, various circuits operate on DC power with a predetermined voltage outputted from the voltage generating circuit 15. The waveform superimposing circuit 17 in the scope A superimposes the scope-side reference pulses and the video signal obtained by the CCD 12 on the power transmitted through the coaxial cable 10. Thus, as described with reference to FIGS. 3A to 3C, approximately ten 28.6363-MHz reference pulses (clock signal) Se outputted from the timing generator 51 outputted to the waveform superimposing circuit 17 are superimposed as a synchronizing signal on the blanking period B of the first horizontal line signal $S_1$ in the first field of the video signal.

On the other hand, the waveform separating circuit 25 of the processor unit B supplies the video signal containing the horizontal line signals $S_1$, $S_2$, $S_3$, . . . described with reference to FIG. 3C to the CDS circuit 32 and supplies the scope-side reference pulses Se separated from the blanking period $B_1$ to the synchronizing signal generator 53 via the phase comparator circuit 52. Then, in the phase comparator circuit 52 and synchronizing signal generator 53, the PLL comes into action and the voltage applied to the variable-capacitance diode 53$b$ changes, causing a clock signal in synchronization with the reference pulses Se as well as causing timing signals such as a horizontal synchronizing signal and vertical synchronizing signal to be generated. Since the location for superimposition of the reference pulses Se is determined in advance to be the first horizontal synchronizing signal in the first field, the synchronizing signal generator 53 can synchronize horizontal scanning and vertical scanning with the reference pulses Se. The horizontal synchronizing signal and vertical synchronizing signal or other timing signals supplied to the CDS circuit 32 and the like allow the video signal to be processed properly.

In the first and second embodiments described above, the processor-side or scope-side reference pulses are superimposed on the blanking period $B_1$ of the first horizontal line signal $S_1$ in the first field of the video signal, but the reference pulses may be superimposed on a blanking period of another horizontal line signal in the first field and in the case of non-interlaced scanning, they may be superimposed on a blanking period of the first horizontal line signal or the like in the first frame. Incidentally, it is also possible to connect the coaxial cable 10 to a light source unit for supplying an illuminating beam, supply power to the scope A from the light source unit, and transmit signals to and from the processor unit B.

As described above, the first and second embodiments allow the power line and signal line to be integrated into, for example, a single coaxial cable by which the electronic endoscope and processor unit can be connected, making it possible to obtain images in good condition. This eliminates bad connections etc. of pins and reduces manufacturing costs.

Third Embodiment

Figure 7:
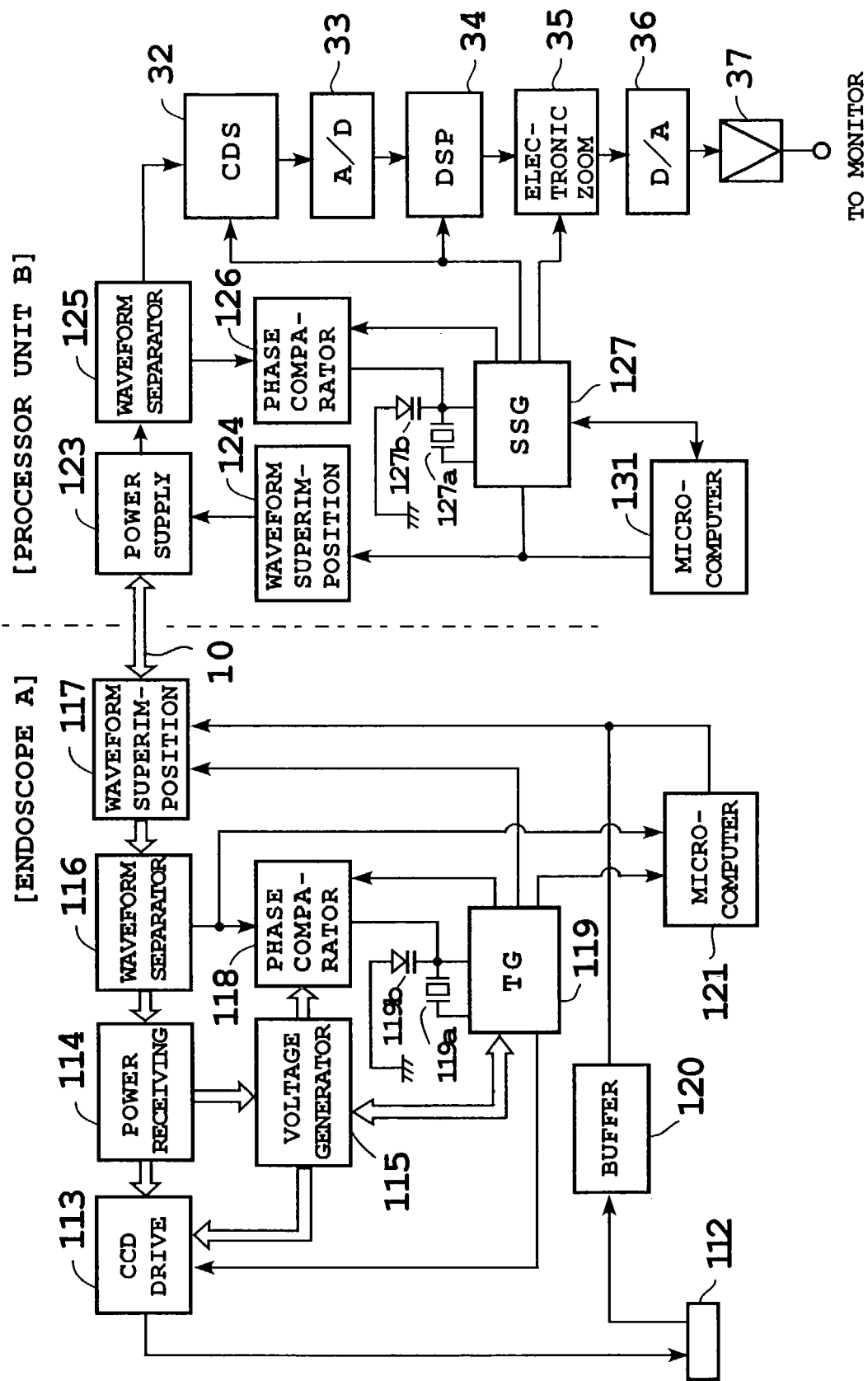
FIG. 7 is a block diagram showing configuration of an electronic endoscope apparatus according to a third embodiment.

FIG. 7 shows configuration of an electronic endoscope apparatus according to a third embodiment. According to this embodiment, the tip of the scope A is equipped with, for example, a 270,000-pixel CCD 112. The scope A comprises a CCD drive circuit 113; power receiving circuit 114; voltage generating circuit 115; waveform separating circuit 116 which separates processor-side reference pulses, control signals, etc. superimposed on the power transmitted through the coaxial cable 10; waveform superimposing circuit 117 which superimposes a waveform of a video signal on transmitted power and superimposes scope-side reference pulses on a blanking period of the first horizontal line signal in the first field of the video signal; phase comparator circuit 118 which compares the phase of an oscillation signal with the phase of processor-side reference pulses (described later); and timing generator 119 which generates a clock signal (e.g., with a frequency of 19.0632 MHz) at the pixel level, horizontal synchronizing (HD) signal, vertical synchronizing (VD) signal, etc.

The timing generator 119 is equipped with a crystal oscillator 119a which generates a frequency of 19.0632 MHz for driving a 270,000-pixel CCD 112 as well as with a variable-capacitance diode 119b. Also, it outputs a 19.0632-MHz clock signal as the scope-side reference pulses and functions as a synchronizing signal generating circuit which generates signals in synchronization with the scope-side reference pulses by forming a PLL in conjunction with the phase comparator circuit 118. The scope A further comprises a buffer 120 and microcomputer 121, etc. The power receiving circuit 114, waveform separating circuit 116, waveform superimposing circuit 117 of the scope A are similar to those shown in FIG. 2.

The processor unit B comprises a power supply circuit 123 which supplies DC power to the scope A, waveform superimposing circuit 124 which superimposes waveforms of control signals and the processor-side reference pulses on the transmitted power during a blanking period of the first horizontal line signal in the second field, and waveform separating circuit 125 which separates the video signal and the scope-side reference pulses (an AC component). It also comprises a phase comparator circuit 126 and synchronizing signal generator (SSG) 127 to receive output from the waveform separating circuit 125. The phase comparator circuit 126 compares the phase of an oscillation signal with the phase of the scope-side reference pulses and generates a voltage proportional to the phase difference.

The synchronizing signal generator 127 is equipped with a crystal oscillator 127a which generates a frequency of 28.6363 MHz for driving a 410,000-pixel CCD as well as with a variable-capacitance diode 127b. It forms a PLL using these components, and thereby generates a clock signal, horizontal synchronizing signal, and vertical synchronizing signal in synchronization with the scope-side reference pulses. Also, the synchronizing signal generator 127 comprises a divider and obtains a frequency of 19.0909 MHz for the clock signal and processor-side reference pulses by dividing the oscillation frequency of 28.6363 MHz at a ratio of 2/3.

Furthermore, the processor unit B comprises an electronic zoom circuit 35 which zooms in and out images electronically as well as a microcomputer 131, correlated double sampling circuit (CDS) 32, A/D converter 33, DSP circuit 34, D/A converter 36, and amplifier 37. In addition to normal zoom-in and zoom-out, the electronic zoom circuit 35 corrects contraction and expansion in horizontal width caused by differences in the clock frequency used in the scope A and processor unit B.

In the third embodiment, configured as described above, when the processor unit B is powered on, DC power is supplied from the power supply circuit 123 to the scope A via the coaxial cable 10. On the other hand, in the scope A, the power receiving circuit 114 receives the DC power from the power supply circuit 123, and then the voltage generating circuit 115 produces power supplies with predetermined voltages and provides them to various circuits.

The waveform superimposing circuit 117 superimposes the video signal outputted from the CCD 112 on the transmitted power and approximately ten 19.0632-MHz reference pulses outputted from the timing generator 119 are superimposed as a synchronizing signal on a blanking period of the first horizontal line signal in the first field of the video signal.

Figure 8:
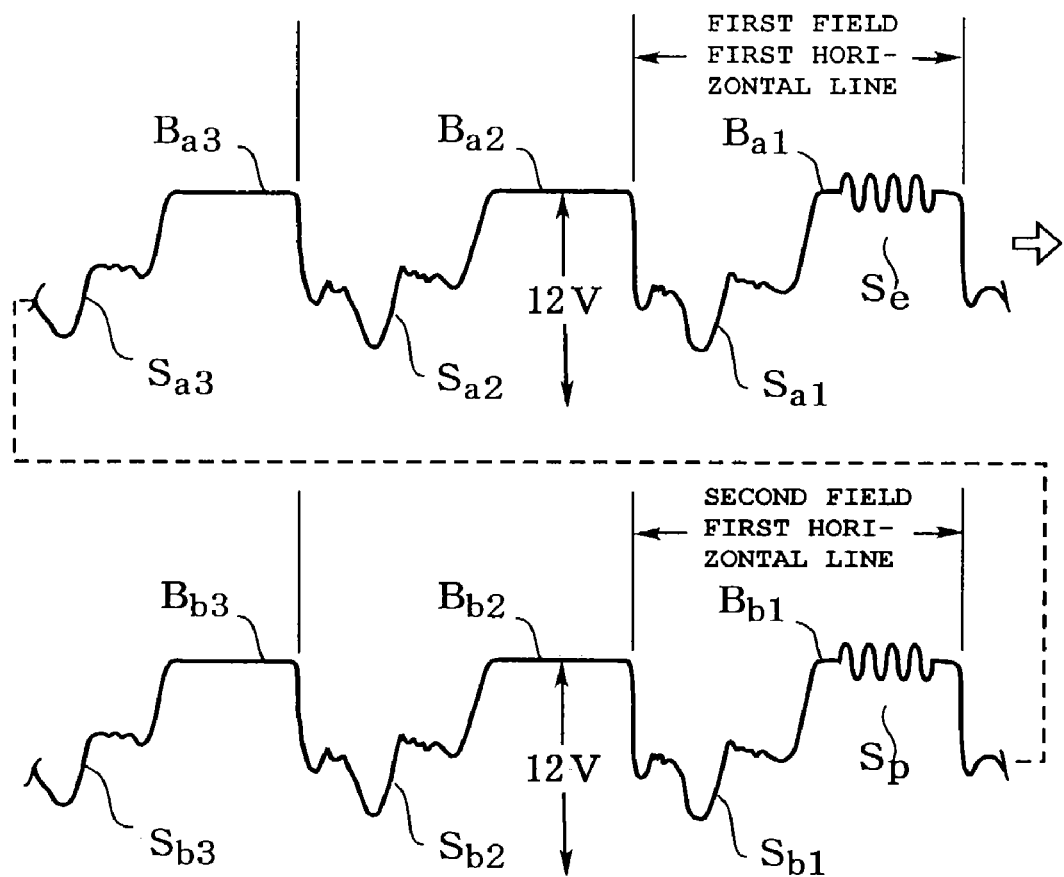
FIG. 8 is a diagram showing how transmission signals are superimposed on transmitted power by a waveform superimposing circuit according to the third embodiment.

FIG. 8 shows outputs of the waveform superimposing circuit 117. For example, horizontal line signals $S_{a1}$, $S_{a2}$, $S_{a3}$, . . . of the video signal are superimposed in an inverted state on a DC voltage of 12 volts. Approximately ten reference pulses Se are superimposed on the blanking period $B_{a1}$ of the first horizontal line $S_{a1}$ in the first field of the video signal.

On the other hand, the waveform separating circuit 125 of the processor unit B separates an AC component supplied via the coaxial cable 10, supplies the video signal containing the horizontal line signals $S_{a1}$, $S_{a2}$, $S_{a3}$, . . . described with reference to FIG. 8 to the CDS circuit 32, and supplies the scope-side reference pulses Se separated from the blanking period $B_{a1}$ to the synchronizing signal generator 127 via the phase comparator circuit 126. Then, in the phase comparator circuit 126 and synchronizing signal generator 127, the PLL comes into action and the voltage applied to the variable-capacitance diode 127b changes, causing a clock signal to be generated in synchronization with the reference pulses Se (with a frequency of 19.0632 MHz) as well as causing timing signals such as a horizontal synchronizing signal and vertical synchronizing signal to be generated.

Since the location for superimposition of the reference pulses Se is determined in advance to be on the first horizontal line in the first field, the synchronizing signal generator 127 can synchronize horizontal scanning and vertical scanning with the reference pulses Se.

However, if the reference pulses (clock signal) Se on the side of the scope A and the reference pulses Sp on the side of the processor unit B differ from each other in frequency, it is not enough to synchronize the processor unit B with the scope-side reference pulses Se. In other words, the approximately ten reference pulses will have their waveform distorted after being transmitted from the scope A to the processor unit B or after passing through a transformer. This makes it impossible to achieve proper synchronization.

Thus, according to the third embodiment, the scope A is synchronized with the processor-side reference pulses Sp as well.

The synchronizing signal generator 127 of the processor unit B shown in FIG. 7 generates the processor-side reference pulses Sp with a frequency of 19.0909 MHz obtained by dividing the frequency of 28.6363 MHz of the oscillator 127a at a ratio of 2/3. The waveform superimposing circuit 124 superimposes approximately ten reference pulses Sp as a synchronizing signal on a blanking period of the first horizontal line signal in the second field of the video signal under the control of the microcomputer 131. That is, approximately ten reference pulses Sp are superimposed on the blanking period $B_{b1}$ of the first horizontal line signal $S_{b1}$ in the second field (generally an even-numbered field) as shown in FIG. 8.

The waveform separating circuit 116 of the scope A separates the processor-side reference pulses Sp from the blanking period $B_{b1}$ of the first horizontal line signal $S_{b1}$ in the second field (described with reference to FIG. 8) via the coaxial cable 10. The reference pulses Sp are supplied to the timing generator 119 via the phase comparator circuit 118. Then, in the timing generator 119, the PLL comes into action and the voltage applied to the variable-capacitance diode 119b changes, causing a clock signal to be generated in synchronization with the reference pulses Sp (with a frequency of 19.0909 MHz). In short, since the processor-side reference pulses Sp are superimposed on the first horizontal line signal in the second field, horizontal scanning and vertical scanning can be synchronized with the reference pulses Sp.

In this way, the processor unit B is synchronized with the scope-side reference pulses (clock signal) Se superimposed on the first horizontal line signal $S_{a1}$ in the first field while the scope A is synchronized with the processor-side reference pulses Sp superimposed on the first horizontal line signal $S_{b1}$ in the second field, enabling stable signal synchronization without waveform distortion.

Figure 9:
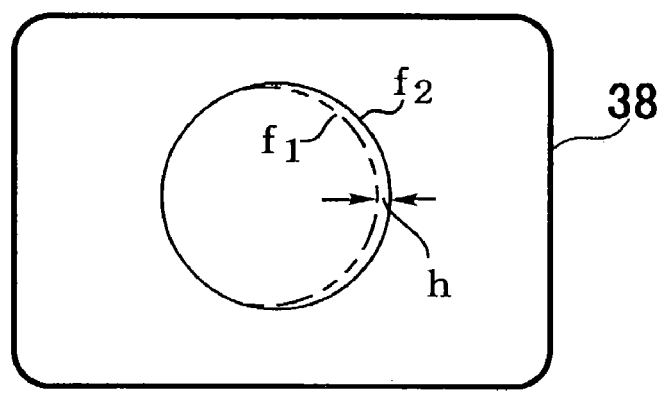
FIG. 9 is a diagram showing a circular object processed and displayed on a monitor according to the third embodiment.

Then, the electronic zoom circuit 35 corrects the horizontal line signal (horizontal width) as follows. In this example, the frequency 19.0632 MHz of the scope-side reference pulses Se and the frequency 19.0909 MHz of the processor-side reference pulses Sp differ from each other, resulting in a slight contraction of the horizontal width as shown in FIG. 9. Specifically, in FIG. 9, the horizontal width of a circular object (or this circle may be regarded as an optical path for observation in an objective optical system) displayed on a monitor 38 contracts as indicated by a chain double-dashed line $f_1$, shifting the image leftward.

The electronic zoom circuit 35 corrects the horizontal line signal using a horizontal synchronizing signal of approximately 63.5 μsec generated from the oscillation frequency of 28.6363 MHz by the synchronizing signal generator 127. Specifically, in an image memory of the electronic zoom circuit 35, image data written in synchronization with the scope-side reference pulses Se are read, timed with the horizontal synchronizing signal of approximately 63.5 μsec. This causes the image to be enlarged by an area equivalent to pixels h (from a ten to tens of pixels) in FIG. 9, resulting in an almost circular object indicated by the solid line $f_2$.

According to the third embodiment just described, the scope-side reference pulses Se are superimposed on the blanking period $B_{a1}$ of the first horizontal line signal $S_{a1}$ in the first field and the processor-side reference pulses Sp are superimposed on the blanking period $B_{b1}$ of the first horizontal line signal $S_{b1}$ in the second field, but these reference pulses may be superimposed on a blanking period of another horizontal line signal in the first or second field. In the case of non-interlaced scanning, the scope-side reference pulses Se may be superimposed on a blanking period of the first horizontal line signal in the first frame and the processor-side reference pulses Sp may be superimposed on a blanking period of the first horizontal line signal in the second frame.

Furthermore, contrary to the third embodiment just described, the processor-side reference pulses Sp may be superimposed on the blanking period of the first horizontal line signal in the first field (or first frame) and the scope-side reference pulses Se may be superimposed on the blanking period of the first horizontal line signal in the second field (or second frame). Then, even if the processor unit B sends a processor-side reference signal first, the timing generator 119 of the scope A can generate a clock signal in synchronization with the reference pulses Sp and recognize the location of the reference pulses Sp is on the first horizontal line signal (horizontal synchronizing signal) in the first field, and thus it can synchronize horizontal scanning and vertical scanning.

Incidentally, the third embodiment can also employ the full-wave rectifier circuit shown in FIG. 4. Besides, a scope equipped with, for example, a 410,000-pixel CCD which is standard for the processor unit B may be connected instead of the 270,000-pixel scope A. In that case, it is sufficient to use only either the processor-side or scope-side reference pulses for synchronization.

In addition, it is also possible to connect the common power/signal line 10 to a light source unit for supplying an illuminating beam, supply power to the scope A from the light source unit, and transmit signals to and from the processor unit B. Furthermore, although the timing generator 119 and synchronizing signal generator 127 use crystal oscillators 119a and 127a, respectively, they may alternatively use an LCR oscillator. The LCR oscillator, which has a wide Q-value range, has the advantage of being able to perform synchronizing operations automatically even if there is a large phase shift.

Thus, the third embodiment makes it possible to form images in good condition even when an electronic endoscope with a CCD with a different pixel count is used.

Fourth Embodiment

Figure 10:
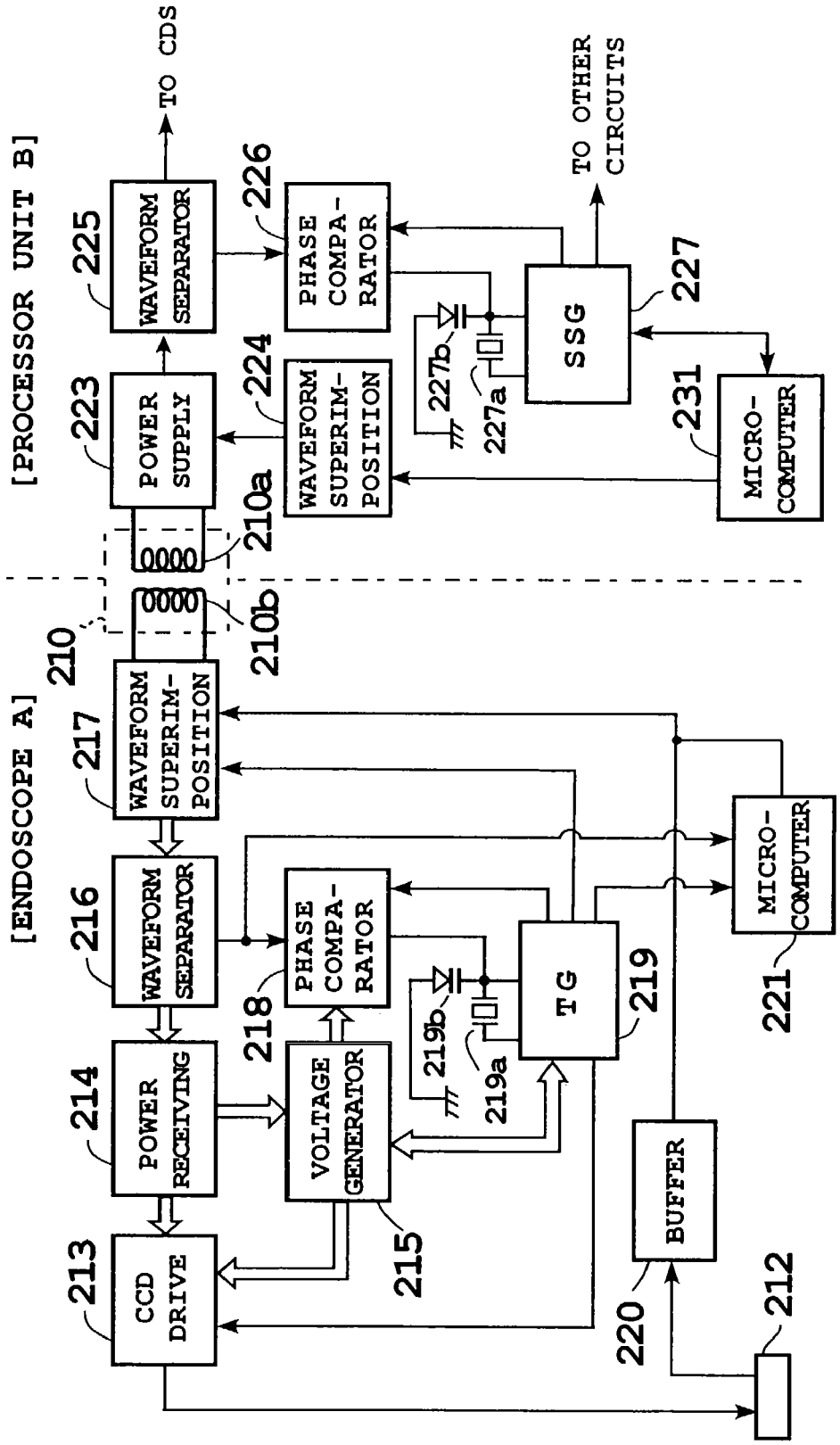
FIG. 10 is a block diagram showing configuration of an electronic endoscope apparatus according to a fourth embodiment.

FIG. 10 show configuration of an electronic endoscope apparatus according to a fourth embodiment. The fourth embodiment uses an electromagnetic coupler in the configuration of the third embodiment. Specifically, instead of the coaxial cable 10, an electromagnetic coupler 210 is used for electromagnetic coupling. The electromagnetic coupler 210 comprises a primary winding 210a on the side of the processor unit B and a secondary winding 210b on the side of the scope A, placed at a predetermined interval. Alternatively, it is possible to install the electromagnetic coupler 210 in an optical connector connecting the light source unit to the scope A, supply AC power from the light source unit, and transmit the video signal and the like through a signal line connecting the light source unit and processor unit.

The scope A is equipped with a CCD 212 with a pixel count of, for example, 270,000, CCD drive circuit 213, power receiving circuit 214 which converts alternating current (AC) into direct current (DC), voltage generating circuit 215, waveform separating circuit 216 which separates AD power and processor-side reference pulses supplied through the electromagnetic coupler 210, waveform superimposing circuit 217, phase comparator circuit 218, and timing generator 219.

On the other hand, the processor unit B is equipped with a power supply circuit 223 which supplies AC power to the scope A via the electromagnetic coupler 210, waveform superimposing circuit 224, high pass filter (HPF) or band pass filter (BPF), and waveform separating circuit 225 which separates the video signal (an AC component) and scope-side reference pulses. The HPF or BPF in the waveform separating circuit 225 may be, for example, a filter which allows a frequency band of 14.32±1.79 MHz to pass. Besides, the processor unit B comprises a phase comparator circuit 226, synchronizing signal generator (SSG) 227, and microcomputer 231.

Figure 11:
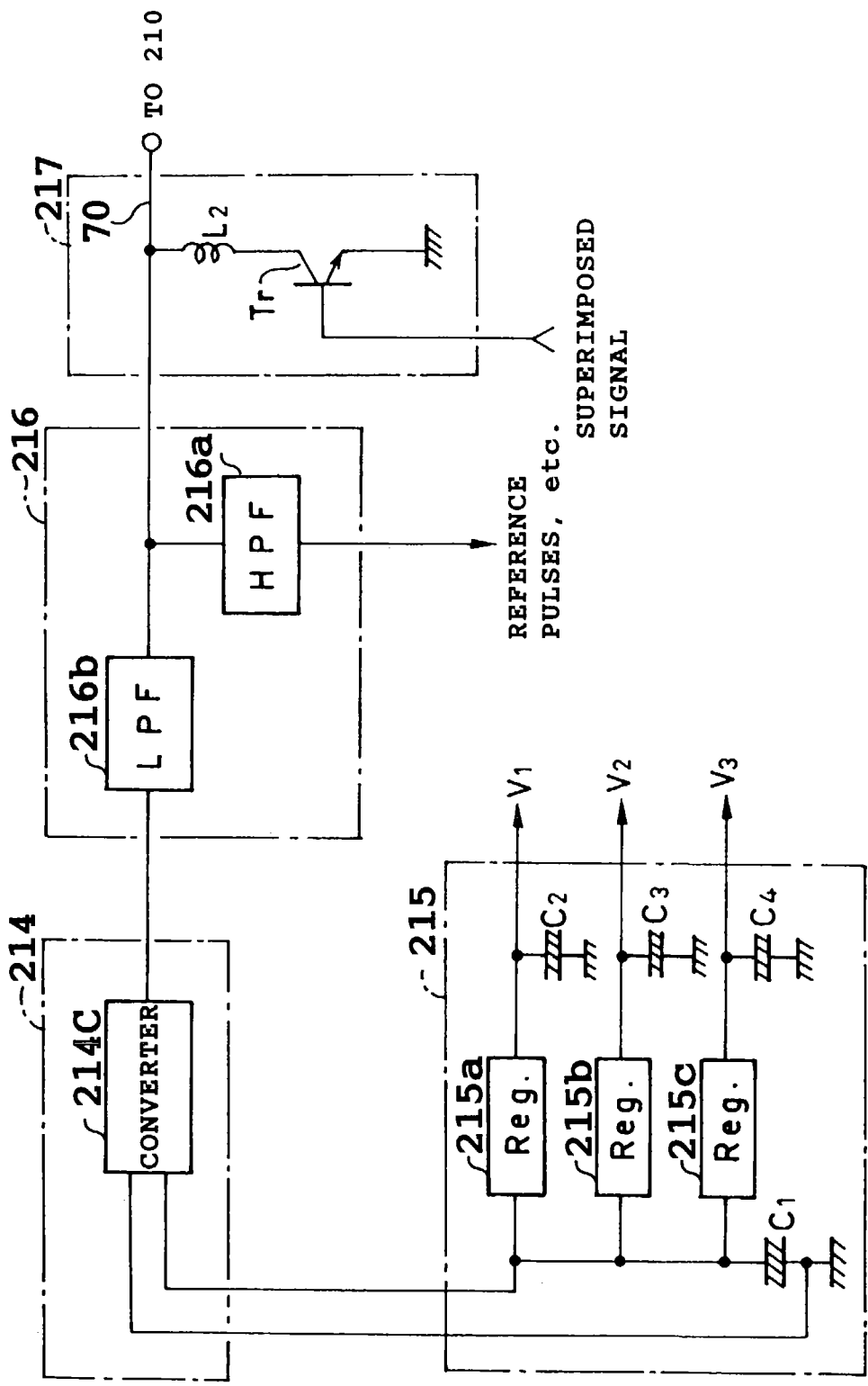
FIG. 11 is a diagram showing a concrete configuration of a power receiving circuit, voltage generating circuit, waveform separating circuit, and waveform superimposing circuit according to the fourth embodiment.

FIG. 11 shows concrete circuits from the power receiving circuit 214 to the waveform superimposing circuit 217 of the scope A. The waveform superimposing circuit 217 consists of a coil $L_2$ and transistor Tr connected between a power/signal line 70 connected to electromagnetic coupler 210, and the ground. The base of the transistor Tr is supplied with the video signal (superimposed signals) and reference clock pulses from the timing generator 219. The waveform separating circuit 216 has a high pass filter (HPF; or a band pass filter) 216a and low pass filter (LPF) 216b. The HPF 216a passes a frequency band of, for example, 4.32±1.79 MHz and separates signal components supplied through the electromagnetic coupler 210, i.e., the processor-side reference pulses and control signals. The LPF 216b passes a power supply frequency of 50 Hz or 60 Hz and separates the AC power supplied from the electromagnetic coupler 210.

The power receiving circuit 214 is equipped with a converter 214C to convert the AC power separated by the LPF 216b into DC power. The voltage generating circuit 215 is equipped with switching regulators 215a, 215b, and 215c to form DC voltages $V_1$, $V_2$, and $V_3$ needed in the scope A. Incidentally, the configuration of the waveform superimposing circuit 217 similarly applies to the waveform superimposing circuit 224 in the processor unit B.

In the fourth embodiment, configured as described above, when the processor unit B is powered on, AC power is supplied from the power supply circuit 223 to the scope A via the electromagnetic coupler 210. Then, the waveform separating circuit 216 of the scope A extracts the AC power. FIGS. 12A to 12G show how AC power and signals are superimposed and separated. The LPF 216b of the waveform separating circuit 216 extracts the waveform 100 of the AC power shown in FIG. 12C from the AC power and signals supplied through the electromagnetic coupler 210 in FIG. 12B. The AC power is supplied to the power receiving circuit 214 and converted there into DC power by the converter 214C. Consequently, the DC power is supplied to the voltage generating circuit 215, which then produces DC power supplies ($V_1$, $V_2$, and $V_3$) using the switching regulators 215a, 215b, and 215c and provides them to various circuits.

The video signal from the CCD 212 is superimposed on the AC power by the waveform superimposing circuit 217 while the 19.0632-MHz reference pulses outputted from the timing generator 219 are superimposed on a horizontal scanning blanking period of the video signal. Thus, as shown in FIG. 12B, the AC waveform 100 is superimposed with the horizontal line signal waveforms (part which actually contains the video signal) $S_{a1}$, $S_{a2}$, ... in the first field and the horizontal line signal waveforms $S_{b1}$, $S_{b2}$, $S_{b3}$, ... in the second field in synchronization with the horizontal scanning shown in FIG. 12A. Approximately ten scope-side reference pulses Se are superimposed on the blanking period $B_{a1}$ of the first horizontal line (1H) in the first field and sent together with the video signal to the processor unit B via the electromagnetic coupler 210.

On the other hand, the waveform separating circuit 225 of the processor unit B separates the signal components supplied via the electromagnetic coupler 210 to produce the HPF output shown in FIG. 12E. The output of the HPF 216a consists of the scope-side reference pulses Se separated from the blanking period $B_{a1}$ shown in FIG. 12F and the horizontal line signals $S_{a1}$, $S_{a2}$, ..., $S_{b1}$, $S_{b2}$, $S_{b3}$, ... constituting a level-shifted video signal shown in FIG. 12G. The scope-side reference pulses Se is supplied to the synchronizing signal generator 227 via the phase comparator circuit 226 while the video signal is supplied from the CDS circuit 32 to downstream circuits. Then, various types of processing are performed based on timing signals synchronized with the reference pulses Se (with a frequency of 19.0632 MHz).

The synchronizing signal generator 227 of the processor unit B generates processor-side reference pulses Sp with a frequency of 19.0909 MHz and the waveform superimposing circuit 224 superimposes them on the blanking period of the first horizontal line signal in the second field of the video signal. That is, approximately ten reference pulses Sp are superimposed on the blanking period $B_{b1}$ of the first horizontal line (1H) in the second field on the power supply as shown in FIG. 12B.

The waveform separating circuit 216 of the scope A separates the processor-side reference pulses Sp from the blanking period $B_{b1}$ of the first horizontal line signal $S_{b1}$ in the second field using the HPF 216a as shown in FIG. 12D. Then, the timing generator 219 generates a clock signal in synchronization with the reference pulses Sp.

In this way, the processor unit B is synchronized with the scope-side reference pulses Se superimposed on the first horizontal line signal $S_{a1}$ in the first field while the scope A is synchronized with the processor-side reference pulses Sp superimposed on the first horizontal line signal $S_{b1}$ in the second field, enabling stable signal synchronization without waveform distortion.

The fourth embodiment described above can connect the electronic endoscope and processor unit electromagnetically using an electromagnetic coupler instead of a power line and signal line. The electromagnetic coupler can also provide electrical isolation between the electronic endoscope and processor unit, and thus has the advantage of being able to simplify configuration by eliminating conventional isolation means.

What is claimed is:

1. An electronic endoscope apparatus comprising:
   an electronic endoscope equipped with an image pickup device;
   a main unit which is connected with the electronic endoscope and includes a processor unit;
   a common power/signal line which connects the electronic endoscope with the main unit;
   a power supply circuit which is installed in the main unit and supplies power to the electronic endoscope via the common power/signal line;
   a video waveform superimposing circuit which is installed in the electronic endoscope and superimposes a video signal obtained by the image pickup device on the power transmitted through the common power/signal line;
   a pulse waveform superimposing circuit which superimposes reference pulses on a blanking period in the first field or first frame of the video signal;
   a pulse separating circuit which separates the reference pulses superimposed on the common power/signal line;
   a circuit which forms a signal in synchronization with the reference pulses; and
   a video separating circuit which is installed in the processor unit and separates the video signal superimposed on the common power/signal line.

2. The electronic endoscope apparatus according to claim 1, wherein:
a processor-side pulse waveform superimposing circuit which superimposes processor-side reference pulses generated by a synchronizing signal generating circuit of the processor unit is installed as the pulse waveform superimposing circuit; and
the pulse separating circuit is installed in the electronic endoscope.

3. The electronic endoscope apparatus according to claim 1, wherein:
a scope-side pulse waveform superimposing circuit which superimposes scope-side reference pulses generated by a timing generator of the electronic endoscope is installed as the pulse waveform superimposing circuit; and
the pulse separating circuit is installed in the processor unit.

4. The electronic endoscope apparatus according to claim 1, wherein a power receiving circuit is installed in the electronic endoscope to full-wave rectify DC power superimposed with the video signal, using a full-wave rectifier circuit.

5. An electronic endoscope apparatus comprising:
an electronic endoscope equipped with an image pickup device;
a main unit which is connected with the electronic endoscope and includes a processor unit;
a common power/signal line which connects the electronic endoscope with the main unit;
a power supply circuit which is installed in the main unit and supplies power to the electronic endoscope via the common power/signal line;
a scope-side waveform superimposing circuit which superimposes a video signal obtained by the image pickup device on power transmitted through the common power/signal line and superimposes scope-side reference pulses on a predetermined blanking period in the video signal;
a processor-side waveform superimposing circuit which superimposes processor-side reference pulses on a predetermined blanking period that occurs in the video signal supplied through the common power/signal line and that is not superimposed with the scope-side reference pulses;
a processor-side separating circuit which separates the video signal and scope-side reference pulses superimposed on the common power/signal line;
a processor-side synchronizing signal generating circuit which forms a signal synchronized with the scope-side reference pulses outputted from the processor-side separating circuit;
a scope-side separating circuit which separates the processor-side reference pulses superimposed on the common power/signal line; and
a scope-side timing generator which forms a signal synchronized with the processor-side reference pulses outputted from the scope-side separating circuit.

6. The electronic endoscope apparatus according to claim 5, wherein:
the scope-side waveform superimposing circuit superimposes the scope-side reference pulses on a predetermined blanking period in the first field or first frame of the video signal; and
the processor-side waveform superimposing circuit superimposes the processor-side reference pulses on a predetermined blanking period in the second field or second frame of the video signal.

7. The electronic endoscope apparatus according to claim 5, wherein:
the scope-side waveform superimposing circuit superimposes the scope-side reference pulses on a predetermined blanking period in the second field or second frame of the video signal; and
the processor-side waveform superimposing circuit superimposes the processor-side reference pulses on a predetermined blanking period in the first field or first frame of the video signal.

8. The electronic endoscope apparatus according to claim 5, wherein oscillation frequency of an oscillator installed in the processor-side synchronizing signal generating circuit differs from oscillation frequency of an oscillator installed in the scope-side timing generator.

9. The electronic endoscope apparatus according to claim 5, wherein the processor unit compensates the horizontal line signal of the video signal separated from the transmitted power with a horizontal synchronizing signal generated by the processor-side synchronizing signal generating circuit.

10. The electronic endoscope apparatus according to claim 5, wherein a power receiving circuit is installed in the electronic endoscope to full-wave rectify DC power superimposed with the video signal using a full-wave rectifier circuit.

11. An electronic endoscope apparatus comprising:
an electronic endoscope equipped with an image pickup device;
a main unit which is connected with the electronic endoscope and includes a processor unit;
an electromagnetic coupler which electromagnetically connects the electronic endoscope and the main unit to supply electric power and signals;
a power supply circuit which is installed in the main unit and supplies AC power to the electronic endoscope via the electromagnetic coupler;
a power receiving circuit which is installed in the electronic endoscope and draws AC power through the electromagnetic coupler;
a waveform superimposing circuit which superimposes a video signal obtained by the image pickup device on the power transmitted through the electromagnetic coupler and superimposes scope-side or processor-side reference pulses on a predetermined blanking period in a field or a frame of the video signal;
a separating circuit which separates the video signal superimposed on the power transmitted through the electromagnetic coupler and scope-side or processor-side reference pulses; and
a synchronizing signal generating circuit which forms a signal synchronized with the scope-side or processor-side reference pulses outputted from the separating circuit.

12. The electronic endoscope apparatus according to claim 11, wherein either the scope-side or processor-side reference pulses are superimposed on a predetermined blanking period in the first field or first frame of the video signal while the other of the scope-side or processor-side reference pulses are superimposed on a predetermined blanking period in the second field or second frame of the video signal.

* * * * *